(12) United States Patent
Potrawa et al.

(10) Patent No.: US 8,664,425 B2
(45) Date of Patent: Mar. 4, 2014

(54) BLUEGREEN FLUORESCENT COMPOUNDS

(75) Inventors: Thomas Potrawa, Seeize (DE); Michael Kessler, Neustadt (DE)

(73) Assignee: Honeywell International Inc., Morristown, NJ (US)

( * ) Notice: Subject to any disclaimer, the term of this patent is extended or adjusted under 35 U.S.C. 154(b) by 524 days.

(21) Appl. No.: 13/012,124

(22) Filed: Jan. 24, 2011

(65) Prior Publication Data
US 2011/0190528 A1 Aug. 4, 2011

Related U.S. Application Data

(60) Provisional application No. 61/300,633, filed on Feb. 2, 2010.

(51) Int. Cl.
*C07C 321/00* (2006.01)

(52) U.S. Cl.
USPC .......................................................... 560/10

(58) Field of Classification Search
None
See application file for complete search history.

(56) References Cited

U.S. PATENT DOCUMENTS 6,458,845 B1 * 10/2002 Weinstock et al. ........... 514/604

FOREIGN PATENT DOCUMENTS

| JP | 2000007645 A | 1/2000 |
| RU | 323402 | 12/1971 |
| WO | 0078145 A1 | 12/2000 |
| WO | 0105398 A1 | 1/2001 |
| WO | 02087568 A1 | 11/2002 |
| WO | 2007124849 A2 | 11/2007 |

* cited by examiner

*Primary Examiner* — Johann R Richter
*Assistant Examiner* — Jennifer C Sawyer
(74) *Attorney, Agent, or Firm* — Ingrassia Fisher & Lorenz, PC

(57) ABSTRACT

Fluorescent compositions having emission under long UV excitation can be utilized as security taggants in printing inks. The fluorescent compositions can be esters of 2-naphthalenesulfonamide, and can be produced as solids in crystal or powder form.

8 Claims, 1 Drawing Sheet

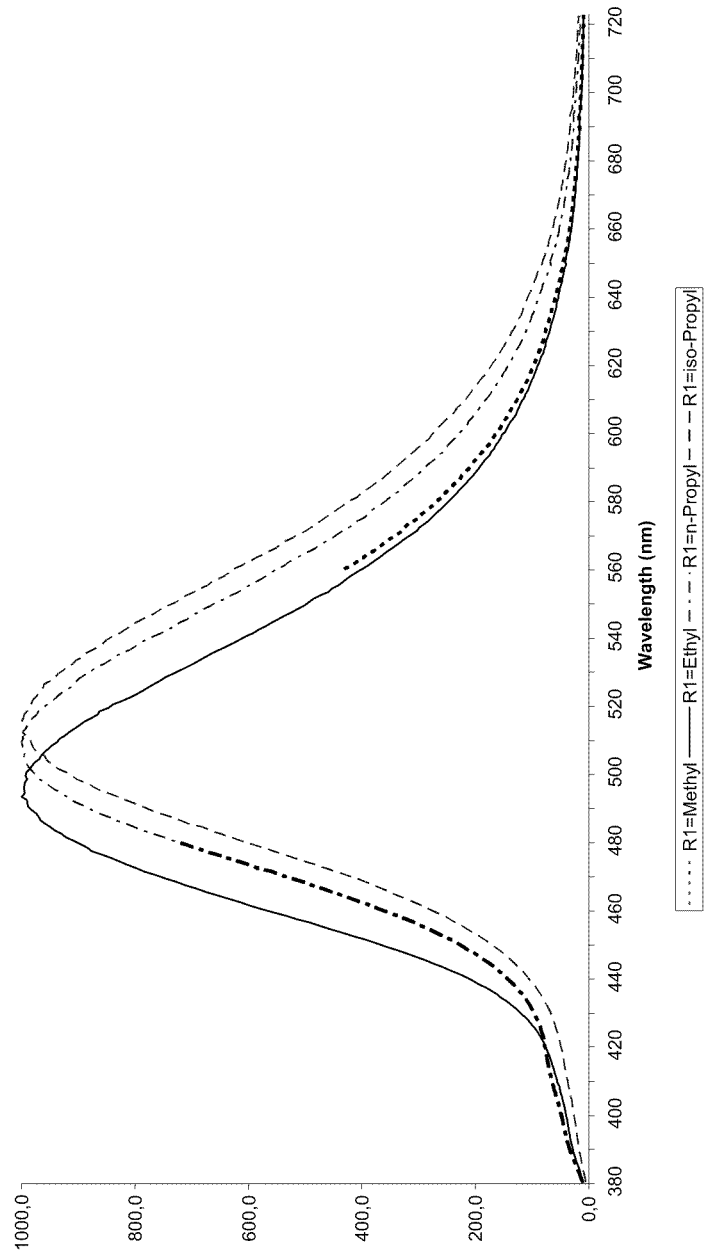

BLUEGREEN FLUORESCENT COMPOUNDS

CROSS-REFERENCE TO RELATED APPLICATIONS

This applications claims the benefit of U.S. Provisional Application Ser. No. 61/300,633, filed on Feb. 2, 2010, currently pending.

FIELD OF THE INVENTION

The present technology relates to fluorescent compositions, and more particularly to fluorescent compositions that can be utilized in printing inks.

DESCRIPTION OF RELATED ART

There are many applications in which it is desirable to incorporate a security feature into a document or other article. Such security features provide ways to authenticate or validate the article and thus prevent counterfeiting. Some security features are visible to the human eye, while others are hidden or invisible and require the use of specialized detection equipment. Visible security features can include, for example, holograms, water marks, embossed images, security ribbons or foils, colored threads or fibers. Hidden or invisible security features can include, for example, fluorescent fibers, chemically sensitive stains, and fluorescent pigments or dyes that can be incorporated into the substrate of an article, the ink printed onto an article, or the resin used to make films with which the article is laminated.

There are some known fluorescent compositions that have bluegreen emissions under long ultraviolet (UV) excitation. For example, metal oxinates such as Lumilux 326 as supplied by Honeywell International Inc. have been used, though such compositions contain crystal water and can thus have a negative impact in producing humidity sensitive inks. Such oxinates also tend to be insoluble, and thus cannot be utilized in manufacturing clear, non-opaque printing inks. In another example, Russian Patent No. 323402 describes the preparation of organic phosphors that are tosylanthraniloylanthranilic acid ethers by reacting the raw materials with alcohol in a pyridine medium.

SUMMARY OF THE INVENTION

Fluorescent compositions of the present technology can be utilized in printing inks, and can be utilized as security features for documents and other articles onto which the inks are printed.

In one example, fluorescent compositions are provided that include an ester of naphthylsulfonlyaminoanthranoylanthranilic acid.

In another example, a method of producing a fluorescent composition is provided that includes combining 2-naphthalenesulfonamide with an alcohol and a catalyst to form a reaction mixture, heating the reaction mixture to form an intermediate composition, and adding an acid to neutralize the catalyst and produce the fluorescent composition.

In a third example, a printing ink is provided that includes a fluorescent composition that is an ester of 2-naphthalenesulfonamide.

BRIEF DESCRIPTION OF THE DRAWINGS

Specific examples have been chosen for purposes of illustration and description, and are shown in the accompanying drawings, forming a part of the specification.

FIG. 1 illustrates the luminescent range in a draw down, showing the fluorescence spectra when R1 is methyl, ethyl, n-propyl, and iso-propyl, respectively.

DETAILED DESCRIPTION

The fluorescent compositions described herein are organic compounds that are fluorescent under long UV excitation, having a bluegreen emission. For example, the fluorescent compositions can be excited by any suitable transmission of UV light having a long wavelength, including but not limited to a wavelength of about 365 nm. The fluorescent compositions include esters of naphthylsulfonlyaminoanthranoyl-anthranilic acid, which can also be written as N-[2-(4-oxo-4H-3,1-benzoxazin-2-yl)phenyl]-. The fluorescent compositions can have a general structural formula in accordance with Formula A below:

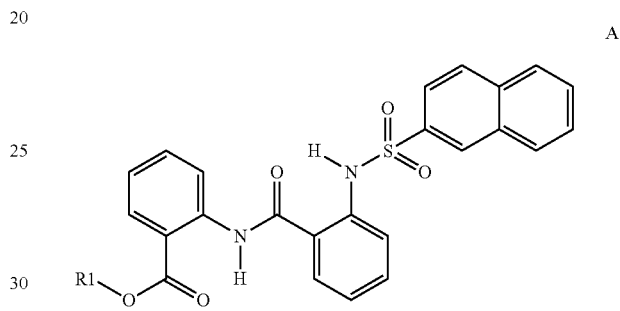

R1 as expressed in Formula A above can be an alkyl or iso-alkyl, including, for example, methyl, ethyl, n-propyl, or iso-propyl. As an illustration of the luminescent range in a draw down, FIG. 1 shows the fluorescence spectra when R1 is methyl, ethyl, n-propyl, and iso-propyl, respectively.

In one example, the fluorescent compositions can be made by reacting 2-naphthalenesulfonamide with a basic compound to form an ester. One method of conducting such a reaction can include combining 2-naphthalenesulfonamide with an alcohol of the general formula ROH and a catalyst to form a reaction mixture, and then heating the reaction mixture to form an intermediate composition. The catalyst can be, for example NaOH or MeOR, and can be utilized in any suitable amount, including, for example, up to about 5% by weight of the reaction mixture, or greater than about 5% by weight of the reaction mixture. When the catalyst has the formula MeOR, it is preferably the corresponding alcoholate of the alcohol used in the reaction mixture, thus the R of the alcohol and the R of the catalyst would be the same.

Upon formation of the intermediate composition, the catalyst can then be neutralized with an acid, such as, for example, hydrogen chloride (HCl), to produce the desired fluorescent ester. The fluorescent ester produced can be in a solid form such as crystal or powder form, where powder is preferred for use in some printing ink applications. The fluorescent ester can then be isolated from the remaining reaction mixture, washed and dried to provide the final fluorescent composition.

The fluorescent compositions of the present invention can be used in fluorescent pigment or dye composition, and can be incorporated into inks as a fluorescent taggant. The inks into which the fluorescent compositions can be incorporated include any suitable ink, including, for example, various types of printing inks. Printing inks can be adapted for use in printing methods including, but not limited to silk screen printing, gravure printing, offset printing, and ink jet printing. In some instances, the inks disclosed herein can be clear or non-opaque. The inks disclosed herein can also be colored.

Example 1

2-[2-(Naphthalene-2-sulfonylamino)-benzoylamino]-benzoic acid ethyl ester

A 1 L three-necked flask was charged with 67.7 g (0.158 mol) N-[2-(4-oxo-4H-3,1-benzoxazin-2-yl)phenyl]-2-naphthalenesulfonamide) and 200 g ethanol. Under stirring, 0.33 g sodium hydroxide (0.0083 mol, correlates to 5.2% of applied raw material) was added. After 15 minutes, the reaction mixture was heated until reflux for 5 hours. Completion of the reaction was monitored by thin layer chromatography. After the 5 hours, the intermediate mixture was cooled to 20° C., and within 20 minutes 4.5 g of 10% hydrochloric acid solution (0.012 mol) was added drop wise. The precipitate consisted of tiny white crystals, and was stirred for 1 hour at room temperature, then filtered by suction, washed with first 150 ml ethanol, then 300 ml water and dried at 85° C. in a circulating air oven.

The product yield was 73.1 g (97 wt %), and the melting point was about 142° C.-144° C. Under excitation with 366 nm UV light, the product fluoresced blue green with a peak maximum of 493 nm.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A fluorescent composition comprising an ester of naphthylsulfonylaminoanthranoylanthranilic acid.

2. The fluorescent composition of claim 1, having a structural formula of Formula A, where R1 is an alkyl or an iso-alkyl:

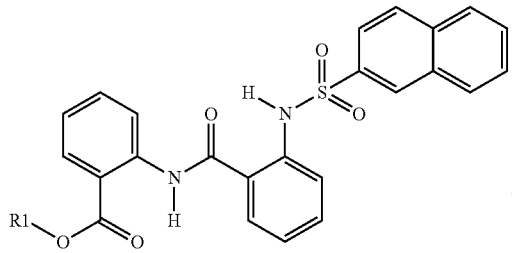

3. The fluorescent composition of claim 2, where R1 is selected from the group consisting of methyl, ethyl, n-propyl, and iso-propyl.

4. A printing ink comprising a fluorescent composition, wherein the fluorescent composition is an ester of naphthylsulfonylaminoanthranoylanthranilic acid.

5. The printing ink of claim 4, wherein the fluorescent composition produces a bluegreen emission under excitation by long wavelength UV light.

6. The printing ink of claim 4, wherein the fluorescent composition has a structural formula of Formula A, where R1 is an alkyl or an iso-alkyl:

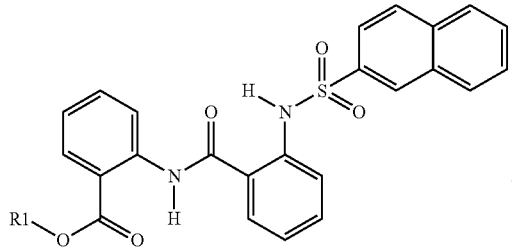

7. The printing ink of claim 6, where R1 is selected from the group consisting of methyl, ethyl, n-propyl, and iso-propyl.

8. The printing ink of claim 4, wherein the printing ink is adapted for use in a printing method selected from the group consisting of silk screen printing, gravure printing, offset printing, and ink jet printing.

* * * * *